(12) United States Patent
Noda

(10) Patent No.: US 9,967,460 B2
(45) Date of Patent: May 8, 2018

(54) PHOTOGRAPHING APPARATUS AND PHOTOGRAPHING METHOD

(71) Applicant: OLYMPUS CORPORATION, Hachioji-shi, Tokyo (JP)

(72) Inventor: Masatoshi Noda, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days. days.

(21) Appl. No.: 15/471,480

(22) Filed: Mar. 28, 2017

(65) Prior Publication Data
US 2017/0289452 A1 Oct. 5, 2017

(30) Foreign Application Priority Data

Mar. 30, 2016 (JP) .................................. 2016-067960

(51) Int. Cl.
- H04N 5/232 (2006.01)
- G03B 7/0805 (2014.01)
- H04N 5/235 (2006.01)
- H04N 5/238 (2006.01)
- G03B 7/095 (2006.01)

(52) U.S. Cl.
CPC ....... H04N 5/23245 (2013.01); G03B 7/0805 (2013.01); G03B 7/095 (2013.01); H04N 5/238 (2013.01); H04N 5/2351 (2013.01); H04N 5/2353 (2013.01)

(58) Field of Classification Search
CPC .. G03B 7/0805; G03B 7/095; H04N 5/23245; H04N 5/2351; H04N 5/2353; H04N 5/238
See application file for complete search history.

(56) References Cited

U.S. PATENT DOCUMENTS

| 5,664,243 A * | 9/1997 | Okada ................... G03B 17/48 |
| | | 348/296 |
| 2005/0219381 A1* | 10/2005 | Takeuchi ............. H04N 5/2352 |
| | | 348/229.1 |
| 2009/0244329 A1* | 10/2009 | Kuniba ................... G06T 5/009 |
| | | 348/241 |

(Continued)

FOREIGN PATENT DOCUMENTS

JP   2006-215310   8/2006

*Primary Examiner* — Amy Hsu
(74) *Attorney, Agent, or Firm* — John C. Pokotylo; Pokotylo Patent Services

(57) ABSTRACT

A photographing apparatus, comprising: an imaging optical system; an image sensor which receives a light flux passing through the imaging optical system, captures an image, and outputs an imaging signal; an aperture which is included in the imaging optical system and which includes an opening to restrict the light flux; a controller which performs a first exposure control to control the exposure of the image sensor by changing the opening of the aperture and calculates, based on an imaging signal output by the image sensor, a deviation between an optimal exposure amount and a currently set actual exposure amount; and an imaging control circuit which performs a second exposure control to control the exposure of the image sensor without changing the opening of the aperture, wherein the controller selects either the first exposure control or the second exposure control based on the deviation to control exposure.

18 Claims, 8 Drawing Sheets

(56) References Cited

U.S. PATENT DOCUMENTS

| | | | |
|---|---|---|---|
| 2010/0259634 A1* | 10/2010 | Goh | H04N 5/2351 348/222.1 |
| 2011/0090393 A1* | 4/2011 | Kawarada | H04N 5/23209 348/345 |
| 2014/0333800 A1* | 11/2014 | Sugie | H04N 5/2355 348/229.1 |
| 2015/0138221 A1* | 5/2015 | Choi | H04N 17/04 345/589 |
| 2015/0163414 A1* | 6/2015 | Nikkanen | H04N 5/353 348/229.1 |
| 2017/0064179 A1* | 3/2017 | Richards | G06K 9/4642 |

* cited by examiner

PHOTOGRAPHING APPARATUS AND PHOTOGRAPHING METHOD

Benefit is claimed, under 35 U.S.C. § 119, to the filing date of prior Japanese Patent Application No. 2016-067960 filed on Mar. 30, 2016. This application is expressly incorporated herein by reference. The scope of the present invention is not limited to any requirements of the specific embodiments described in the application.

BACKGROUND OF THE INVENTION

1. Field of the Invention

The present invention relates to photographing apparatuses and photographing methods capable of following a change in the brightness of an image to be captured and photographing at an optimal exposure in capturing a moving image using a photographing apparatus having an aperture.

2. Description of Related Art

For a moving image, the images captured at a predetermined frame rate are continuously reproduced. Therefore, from the viewpoint of a viewer, an abrupt change in brightness of a captured image is not preferred, but a smooth change in brightness is preferred. Then, there is proposed a method including the steps of: at the time of capturing a moving image, changing the driving speed of an aperture based on a difference between a target exposure and an actual exposure, and increasing the driving speed of the aperture when the difference in exposure is larger or reducing the driving speed when the difference in exposure is smaller, thereby performing a smooth AE-control with respect to a change in brightness of an image to be captured (e.g., see Japanese patent laid-open No. 2006-215310 (hereinafter, referred to as Patent Literature 1)).

The interchangeable lens for a single-lens reflex camera or the like is mainly intended to capture a still image and has a number of aperture blades, and therefore the dynamic characteristic finely controlling the stop position and/or driving speed of an aperture does not require a high level of dynamic characteristic. However, the interchangeable lens for a single-lens reflex camera or the like is increasingly used in capturing a moving image. In this case, originally-ideal exposure variation amount and speed cannot be reproduced by an aperture operation and therefore the appearance of a moving image will degrade.

SUMMARY OF THE INVENTION

A purpose of the present invention is to provide photographing apparatuses and photographing methods capable of preventing the appearance of a moving image from degrading even when the brightness of an image to be captured varies.

A photographing apparatus according to a first aspect of the present invention, comprising: an imaging optical system; an image sensor which receives a light flux passing through the imaging optical system, captures an image, and outputs an imaging signal; an aperture which is included in the imaging optical system and which includes an opening to restrict the light flux; a controller which performs a first exposure control to control the exposure of the image sensor by changing the opening of the aperture and calculates, based on an imaging signal output by the image sensor, a deviation between an optimal exposure amount and a currently set actual exposure amount; and an imaging control circuit which performs a second exposure control to control the exposure of the image sensor without changing the opening of the aperture, wherein the controller selects either the first exposure control or the second exposure control based on the deviation to control exposure.

A photographing method according to a second aspect of the present invention is the photographing method of a photographing apparatus including: an imaging optical system, an image sensor which receives a light flux passing through the imaging optical system, captures an image, and outputs an imaging signal; and an aperture which is included in the imaging optical system and which includes an opening to restrict the light flux, the method comprising the steps of: calculating a deviation between an optimal exposure amount and a currently set actual exposure amount, based on an imaging signal output by the image sensor; performing a first exposure control to control the exposure of the image sensor by changing the opening of the aperture; performing a second exposure control to control the exposure of the image sensor without changing the opening of the aperture; and selecting either the first exposure control or the second exposure control based on the deviation and controlling exposure using the selected exposure control.

DETAILED DESCRIPTION OF THE PREFERRED EMBODIMENTS

Hereinafter, an example applied to a digital camera as an embodiment of the present invention will be described. This camera includes an imaging section. Here, a subject image is converted into image data by the imaging section, and based on this converted image data a live-view of the subject image is displayed on a display section arranged on the backside of a main body. A photographer observes the displayed live-view to determine a composition and/or shutter timing. During a release operation, the image data of a still image is stored into a storage medium, while upon operation of a video button, the image data of a moving image is stored into the storage medium. The image data of a still image and moving image stored in the storage medium can be reproduced and displayed in a display section once a reproduction mode is selected.

Further, at the time of capturing a moving image, based on the brightness of an image to be captured and on a difference between an actual exposure amount and an optimal exposure amount, it is determined whether the shutter is controlled, or the aperture is controlled, or the ISO sensitivity is controlled, and then the exposure is controlled based on this determination result. Moreover, in selecting an object to be controlled, the flicker grade, image blur grade, noise grade, and the like are determined taking into consideration an ideal value, ideal control range, and limit (limit evaluation value (indicator) of an image) of each of these grades. In a range where a difference between an actual exposure amount and an optimal exposure amount is small, a viewer feels uneasy about a change in the brightness of an image caused by a change of the aperture and senses a degradation in the image quality. Therefore, in the range where a difference between an actual exposure amount and an optimal exposure amount is small, the viewer will control the exposure with the shutter speed and ISO sensitivity.

Figure 1:
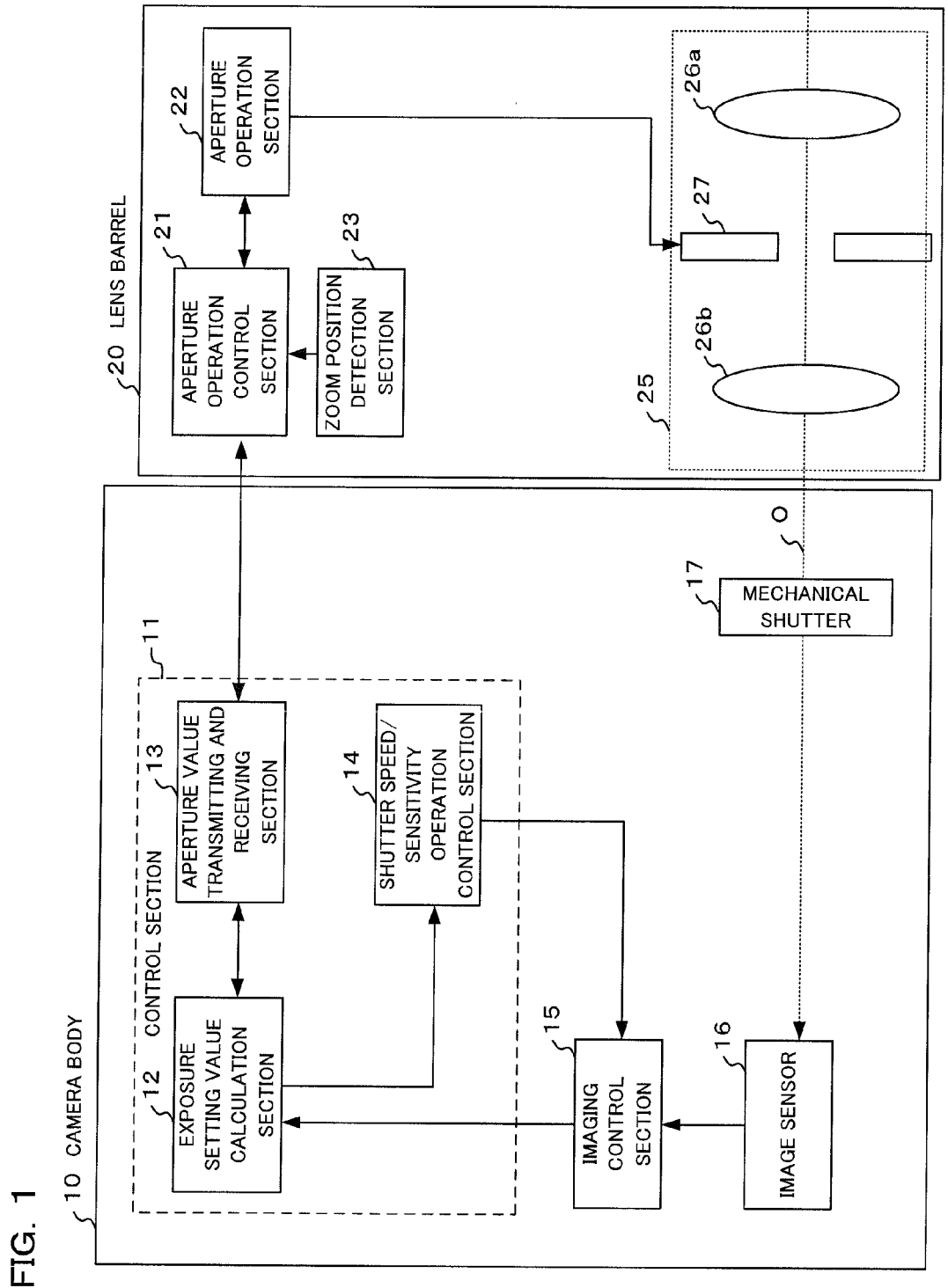
FIG. 1 is a block diagram mainly illustrating an electrical configuration of a camera according to an embodiment of the present invention.

FIG. 1 is a block diagram mainly illustrating an electrical configuration of a camera according to the present embodiment. The camera according to the present embodiment includes a camera body 10 and a lens barrel 20. The camera body 10 and the lens barrel 20 may be integrally constructed, or may be separately constructed. In separately constructing the camera body 10 and the lens barrel 20, the lens barrel 20 is made freely mountable on the camera body 10, so that a control section 11 inside the camera body 10 and an aperture operation control section 21 inside the lens barrel 20 are electrically connected in mounting the lens barrel 20 on the camera body 10, thereby allowing for communication therebetween.

The camera body 10 includes the control section 11, an imaging control section 15, an image sensor 16, and a mechanical shutter 17. Further, the lens barrel 20 includes the aperture operation control section 21, an aperture operation section 22, a zoom position detection section 23, and an imaging optical system 25.

The imaging optical system 25 includes a front group lens 26a, a rear group lens 26b (collectively referred to as a lens 26), and an aperture 27. The focus adjustment can be made by moving a focus lens inside the lens 26 in the direction of an optical axis O. Furthermore, the focal length can be changed by moving the zoom lens inside the lens 26 in the direction of the optical axis O.

The aperture 27 is arranged between the front group lens 26a and the rear group lens 26b. The opening diameter of the aperture 27 is changed by the aperture operation section 22, so that the subject light quantity passing through the imaging optical system 25 is controlled. The aperture 27 is included in the imaging optical system, has an opening, and functions as an aperture restricting the light flux.

The mechanical shutter 17 is arranged, inside the camera body 10, on the optical axis O of the imaging optical system 25. The mechanical shutter 17 allows passing there through and blocks the subject light flux passing through the imaging optical system 25, and at the time of capturing a still image, controls the exposure time (shutter speed) of a subject image for the image sensor 16. Note that, at the time of capturing a moving image, the mechanical shutter 17 is opened, and the exposure time of the subject image for the image sensor 16 is controlled by an electronic shutter of the image sensor 16.

The image sensor 16 includes a solid state image sensor, such as a CCD (Charge Coupled Device) image sensor or a CMOS (Complementary Metal-Oxide-Semiconductor) image sensor. The image sensor 16 photo-electric converts a subject image, which has been formed by the lens 26, and outputs an imaging signal. The above-described imaging optical system 25 and image sensor 16 function as an imaging section which receives a light flux passing through the imaging optical system, captures an image, and outputs an imaging signal.

The imaging control section 15 includes an imaging control circuit, and performs the exposure time control (shutter control) of the image sensor 16, the reading control of an imaging signal, and the like. That is, the imaging control section 15 controls the exposure time (shutter speed) of each frame at the time of capturing a moving image, using shutter speed information from a shutter speed/sensitivity operation section 14. Moreover, the imaging control section 15 performs the amplification processing on an imaging signal read after an exposure time has elapsed, in response to the sensitivity information from the shutter speed/sensitivity operation section 14.

The imaging signal read and processed by the imaging control section 15 is output to the control section 11. The imaging control section 15 functions as a second exposure controller which controls the exposure of the image sensor without changing the opening of the aperture. This second exposure controller controls the exposure by changing the imaging sensitivity of the image sensor. Moreover, the second exposure controller controls the exposure by changing the electronic shutter speed of the image sensor.

The control section 11 includes a CPU (Central Processing Unit), its peripheral circuit, and a memory, and controls each section inside the camera in accordance with a program stored in the memory. The control section 11 includes an exposure setting value calculation section 12 and the shutter speed/sensitivity operation section 14, which are the functional blocks performed by the CPU, the program, and the like. Further, the control section 11 includes an aperture value transmitting and receiving section 13 for transmitting and receiving a signal to and from the aperture operation section 21 inside the lens barrel 20 for communication.

The exposure setting value calculation section 12 calculates the brightness of an image to be captured, based on an imaging signal input from the imaging control section 15. The exposure setting value calculation section 12 calculates the shutter speed and sensitivity based on the brightness of the image to be captured and outputs the calculation results to the shutter speed/sensitivity operation section 14, and also calculates an aperture value and outputs the calculation result to the aperture value transmitting and receiving section 13. In calculating these exposure control values, a deviation between an optimal exposure amount based on an imaging signal and an actual exposure amount based on currently set exposure control values (the aperture, shutter speed, and ISO sensitivity) is calculated, and based on this deviation, it is determined whether to control the exposure by changing an opening of the aperture or to control the exposure without changing the opening of the aperture (e.g., see S13, S17, S19, S29, S33, S35 and the like of FIG. 5).

That is, the exposure setting value calculation section 12 functions as an exposure deviation calculation section which calculates, based on an imaging signal output by the image sensor, a deviation between the optimal exposure amount and the currently set actual exposure amount and as a controller which selects a first exposure controller or a second exposure controller based on the deviation to control exposure.

Moreover, the exposure setting value calculation section 12 functions also as a limit exposure control value setting section which sets an exposure control value (e.g., an ISO sensitivity Sv or a shutter speed Tv by the imaging control section 15) of the second exposure controller, the exposure control value serving as a limit of the grade of an image to capture. Here, examples of the limit of the grade of an image (the limit of a first grade: a limit evaluation value of moving-image quality) include a flicker grade, an image blur grade, a noise grade, and the like (see FIG. 2).

Figure 5:
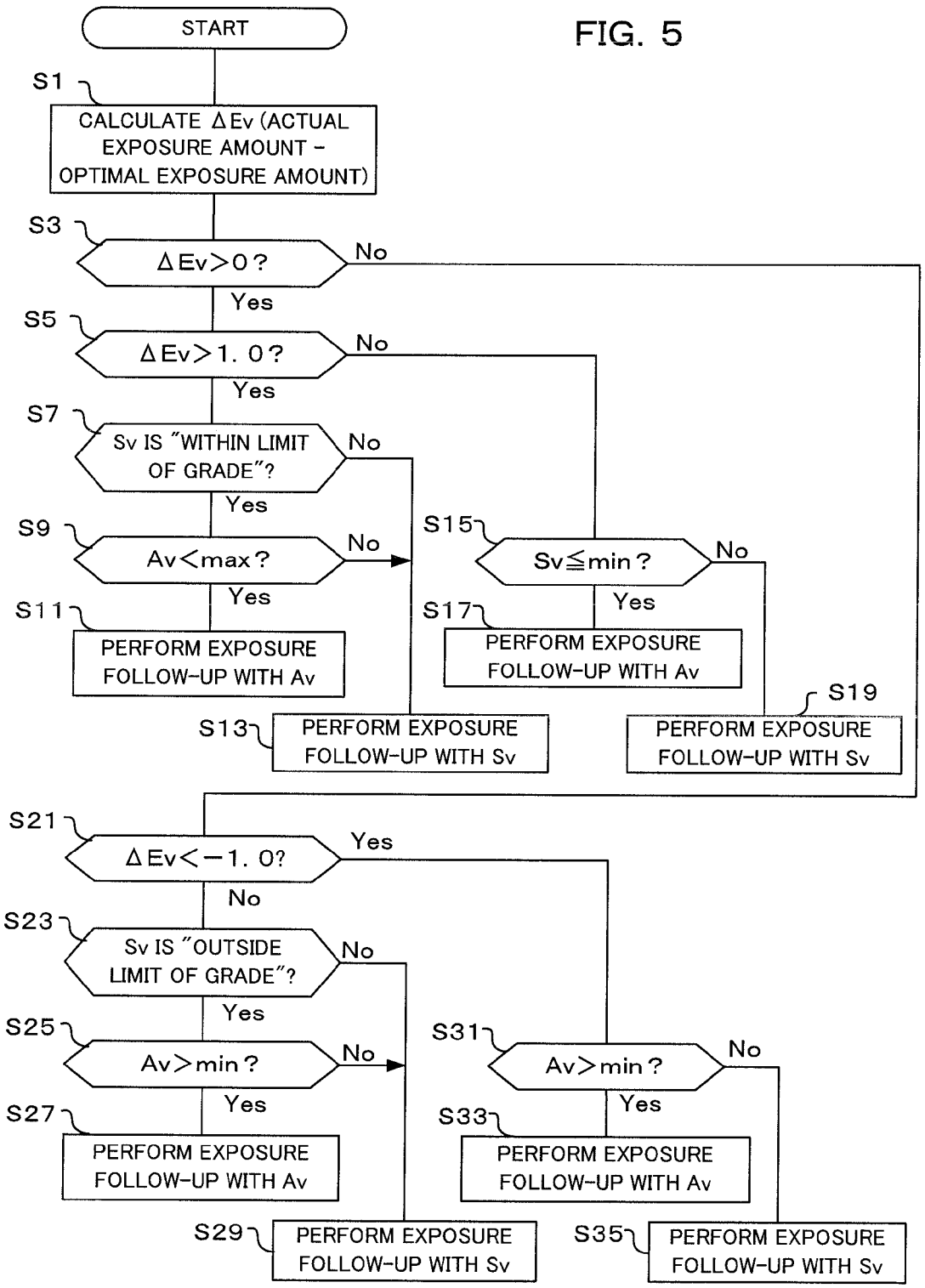
FIG. 5 is a flow chart illustrating an exposure control operation when the shutter speed priority mode is set in the camera according to an embodiment of the present invention.
Figure 6:
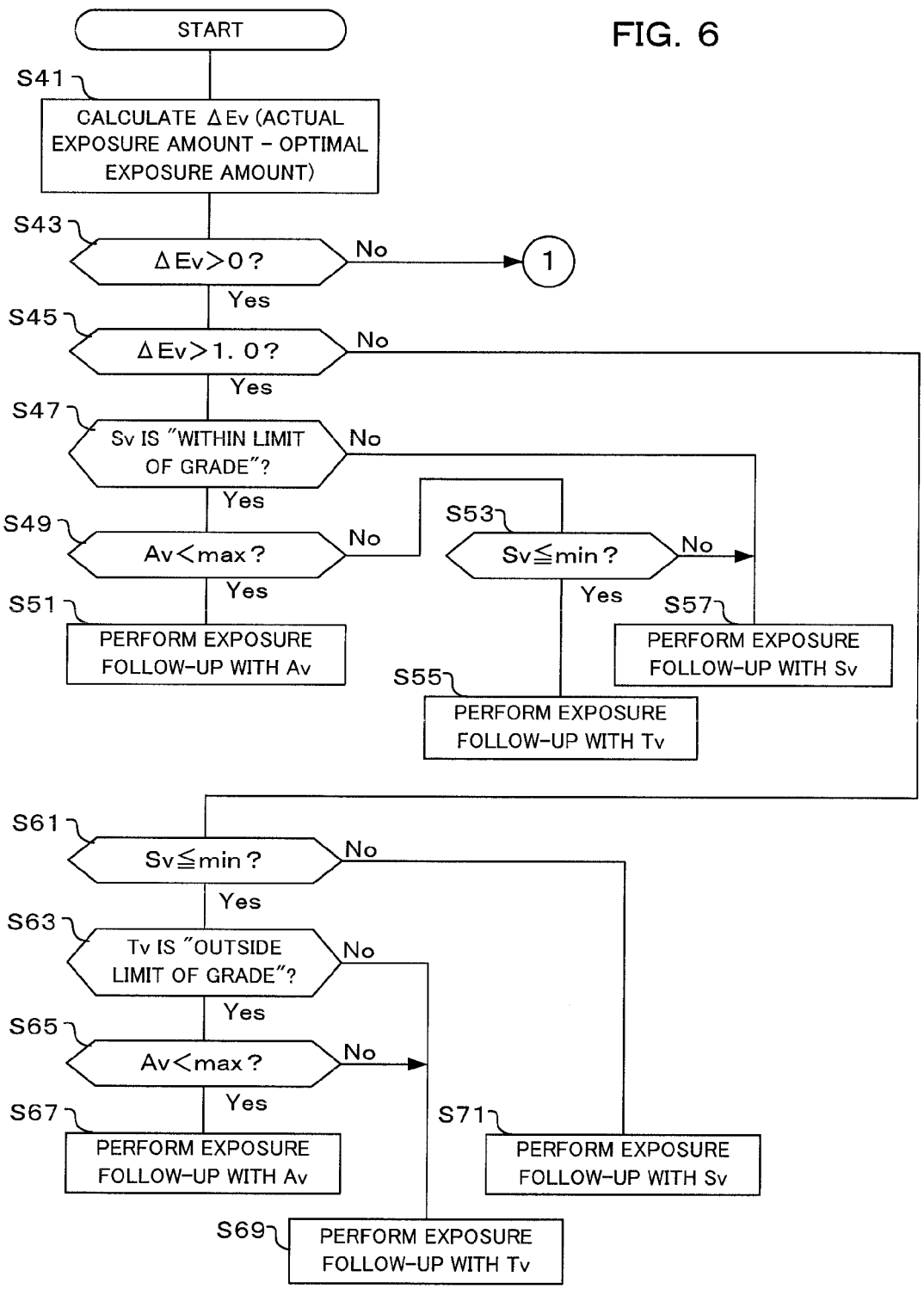
FIG. 6 is a flow chart illustrating an exposure control operation when the program mode is set in the camera according to an embodiment of the present invention.
Figure 7:
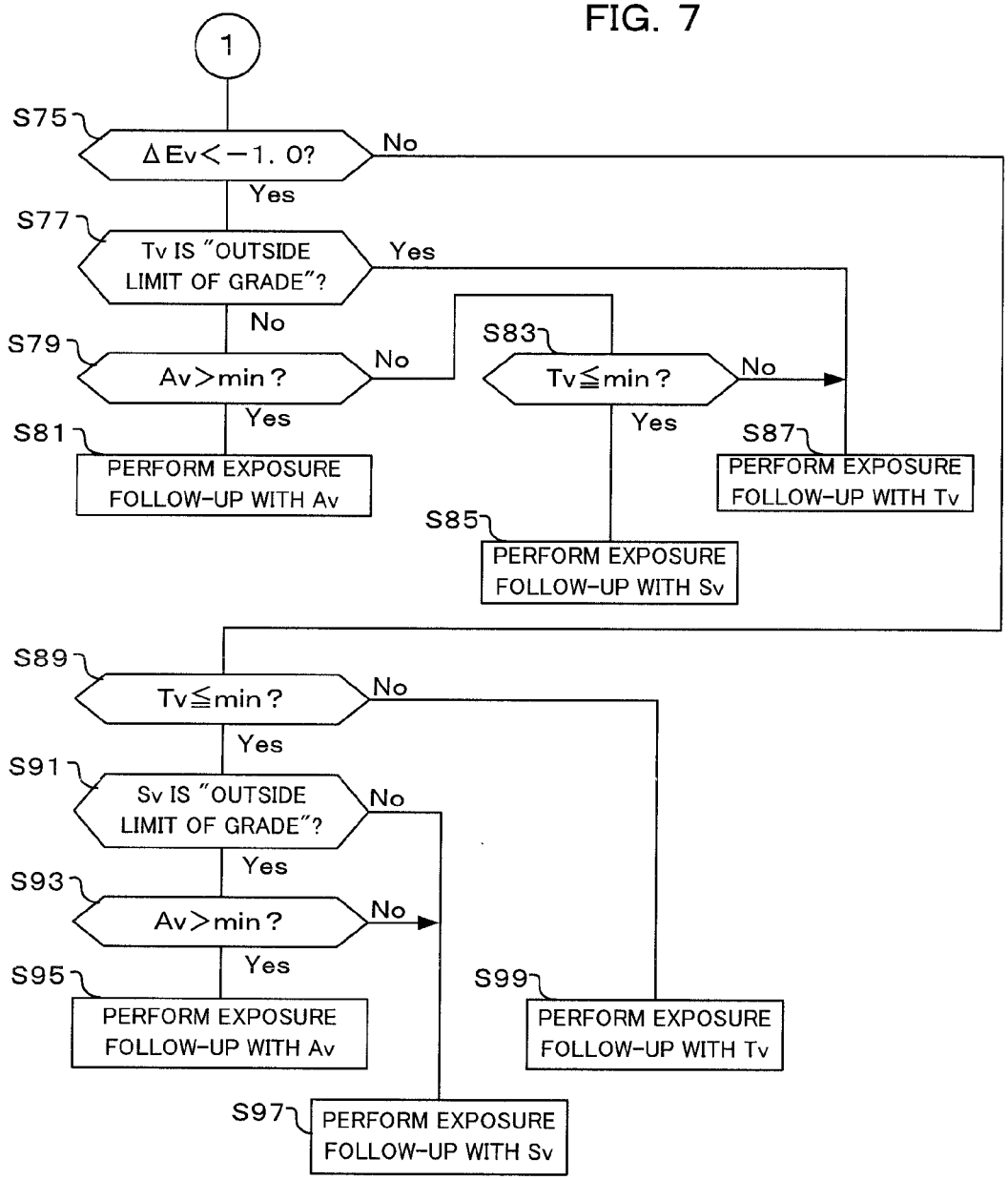
FIG. 7 is a flow chart illustrating the exposure control operation when the program mode is set in the camera according to an embodiment of the present invention.

The above-described controller selects, once the exposure control value of the second exposure controller has reached the limit exposure control value while selecting the second exposure controller, the first exposure controller to control exposure (e.g., see, "No" in S7 and "Yes" in S23 of FIG. 5, "Yes" in S63 of FIG. 6, "No" in S77 and "Yes" in S91 of FIG. 7, and the like). This grade limit may be stored as a set value in advance, or a user may set this grade manually, or this grade may be automatically corrected using the parameters, such as the focal length and temperature.

Moreover, the above-described controller selects, once the exposure control value of the first exposure controller has reached an exposure control value corresponding to an opening limit of the aperture while selecting the first exposure controller (e.g. aperture control by the aperture operation control section 21), the second exposure controller to control exposure (e.g., see, "No" in S9, "No" in S25, "No" in S31 and the like of FIG. 5).

Furthermore, the exposure setting calculation section 12 functions also as a grade limit setting section which sets the limit of the grade of a moving image to capture. This limit exposure control value setting section sets a limit exposure control value based on a set limit of a moving image (a limit of the second grade: limit evaluation value of moving-image quality).

Further, the exposure setting calculation section 12 functions also as an exposure mode setting section. When a shutter speed priority mode is set as the exposure mode by the exposure mode setting section, the second exposure controller controls the exposure by changing the imaging sensitivity of the imaging section (e.g., see S13, S19, S29, S35, and the like of FIG. 3 and FIG. 5). Moreover, in the exposure setting calculation section 12, when the program mode is set as the exposure mode by the exposure mode setting section, the second exposure controller controls the exposure by changing the electronic shutter speed of the imaging section (e.g., see S55, S69 of FIG. 4 and FIG. 6, S87, S99 of FIG. 7, and the like). Note that the exposure setting calculation section 12 sets the exposure mode based on an operation state when a user has manipulated the manipulating section.

Upon receipt of the shutter speed and sensitivity calculated by the exposure setting value calculation section 12, the shutter speed/sensitivity operation section 14 outputs a control signal to the imaging control section 15 so as to achieve these shutter speed and sensitivity.

The aperture value transmitting and receiving section 13 includes a communication circuit, and outputs, upon receipt of an aperture value calculated by the exposure setting value calculation section 12, the aperture value to the aperture operation control section 21 inside the lens barrel 20. Moreover, the aperture value transmitting and receiving section 13 receives, when the zoom position detection section 23 has detected a focal length of the imaging optical system 25, the focal-length information via the aperture operation control section 21. In calculating an aperture value, the exposure setting value calculation section 12 uses the focal-length information input by the aperture value transmitting and receiving section 13. This is because the aperture value varies with a focal length.

The aperture operation control section 21 includes a CPU, its peripheral circuit, and a memory having a program stored therein, in the case where the lens barrel 20 is an interchangeable lens. In the case where the lens barrel is integrally constructed with the camera body, the CPU, its peripheral circuit, and the memory having a program stored therein are provided inside the control section 11. The aperture operation control section 21 controls the opening amount of the aperture 27 via the aperture operation section 22 based on an aperture value from the control section 11. Moreover, it also outputs the focal-length information of the imaging optical system 25 detected by the zoom position detection section 23 to the control section 11. The aperture operation control section 21 functions as a first exposure controller which controls the exposure of the imaging section by changing the opening of the aperture.

The zoom position detection section 23 includes a sensor, such as a zoom encoder, and detects the position of the zoom lens inside the lenses 26 and outputs the focal-length information to the aperture operation control section 21.

The aperture operation section 22 includes a drive section for a stepping motor or the like, and an aperture driving mechanism. The aperture operation section 22 controls the opening amount of the aperture 27 based on the aperture value information from the aperture operation control section 21.

In the exposure control of a camera in the present embodiment, using $\Delta$Ev (difference between an optimal exposure amount and an actual exposure amount) and a limit of the grade of each exposure other than the aperture, the limit being defined under a predetermined condition, an exposure-controlled object (specifically, either of the aperture, shutter speed, or ISO sensitivity) controlled with a higher priority is determined. Prior to describing this control method, the limit of the grade of each exposure will be described by the use of FIG. 2.

Figure 2:
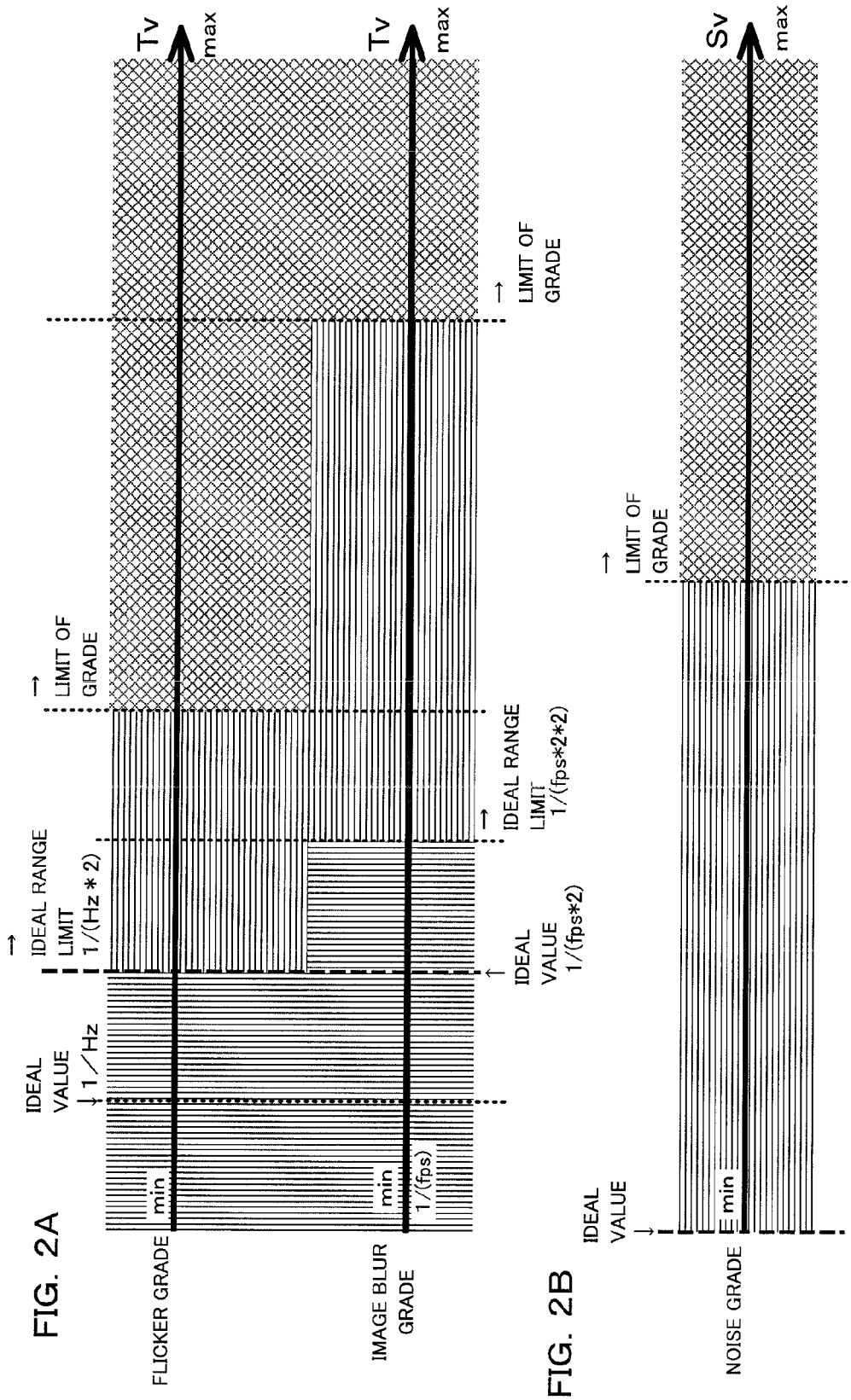
FIG. 2A and FIG. 2B illustrate the limits of the grade used in determining an exposure control, in the camera according to an embodiment of the present invention.

The grade of each exposure refers to the content which affects the appearance (image quality) of a moving image by manipulating the exposure with the shutter speed (Tv) and/or ISO sensitivity (Sv). For example, in controlling the shutter speed (Tv), the "flicker" and/or "image blur amount (subject shake amount)" affect as the grade, while in controlling the ISO sensitivity (Sv), "noise amount" affects as the grade. In each of the above items, the boundary of the exposure setting value, where the appearance degrades more than when the aperture is moved, is defined as the limit of the grade. FIG. 2 illustrates an image of the grade of each exposure listed in each item. A point where the grade becomes best is defined as an ideal value/ideal range (the shaded portion in FIG. 2), and serves as the determination criterion of the priority in switching the exposure control between Tv and Sv.

The flicker is a stripe which is generated in a captured image due to a combination of an imaging frame rate and a light source blinking at a predetermined period. The flicker basically becomes less noticeable if the frequency of the blinking of a light source is in synchronization with the shutter speed or if the shutter speed becomes slow. On the contrary, if the shutter speed becomes fast, the flicker is likely to be noticeable and the appearance of an image will degrade.

In the upper part of FIG. 2A, the horizontal axis is the shutter speed, in which the right side is the high speed side while the left side is the low speed side. Note that FIG. 2A is illustrated under the following conditions: the AC power frequency Hz is 60 Hz and the imaging frame rate fps is 60 fps, as an example. The ideal value of the flicker grade is assumed to be a Tv value corresponding to the (flashing frequency (i.e., 1/(Hz*2)) of a light source blinking in synchronization with the AC-power frequency Hz −1Ev in 1/Hz), for example. The ideal range is assumed to be a range consisting of the low speed side from the ideal value and of a range from the ideal value to the Tv value (ideal range limit) of 1/(Hz*2) of the ideal value +1EV in which the flicker is not visible (the shaded range in the drawing).

In the range in which the shutter speed is from the ideal range limit of the flicker grade to a limit of the grade on the high speed side, the effect of a stripe due to the flicker will appear in the image. However, at this time, the effect of a stripe due to the flicker appearing is assumed to be within an allowable range (the horizontally striped range in the drawing) as the grade of a moving image, generally taking into consideration the visual characteristics of a human being. The limit of the grade differs with the type of a stripe caused by the flicker, and/or with the imaging frame rate. The Tv value corresponding to the limit of the flicker grade is stored in the memory in advance, which is later read from the memory by the control section 11 and used as a limit of the flicker grade. Furthermore, since the limit of the flicker grade is sensory and differs for each user, a user may adjust the Tv value corresponding to the limit of the flicker grade by manipulating the manipulating section. Moreover, the control section 11 may restrict the range adjustable by a user to between the ideal value or ideal range limit and the limit of the flicker grade stored in the memory.

An image blur amount refers to a subject shake amount for each one frame of a moving image (movement amount of a subject image in one frame time). The faster the shutter speed, the smaller the image blur amount becomes. In a moving image, unlike in a still image, the continuity of the movement of a subject image between frames also relates to the appearance of the image and the image blur has a role to interpolate the movement of an image between frames. If the image blur amount becomes too small, the movement of an image between frames becomes clumsy and the moving image does not look nice. If the image blur amount becomes too large, the moving image appears to be shaking. Note that it is assumed that the shutter speed is not set to a speed slower than the imaging frame rate.

In the lower part of FIG. 2A, the horizontal axis is the shutter speed, in which the right side is the high speed side while the left side is the low speed side. An ideal value of the grade of image blur is assumed from the "180-degree law of the shutter", and is set to a Tv value corresponding to 1/(fps*2) (here, fps is the frame rate). The ideal range is assumed to be a range in which the image blur amount becomes ideal, and be a range equal to or less than the 180-degree shutter and be a range equal to or greater than the 180-degree shutter and equal to or greater than +1EV (the shaded range in the drawing). That is, the limit of the ideal range is assumed to be the Tv value corresponding to 1/(fps*2*2). The limit of the grade corresponds to the shutter speed Tv when the movement between frames appears clumsy.

The range from the limit of the ideal range of the image blur grade to the limit of the grade toward the high speed side is assumed to be an allowable range in general as the grade of a moving image although the effect of clumsy movement between frames appears in the image (the horizontally striped range in the drawing). The Tv value corresponding to the limit of the image blur grade is stored in the memory in advance, which is later read from the memory by the control section 11 and is used as the limit of the image blur grade. Furthermore, since the limit of the image blur grade is sensory and differs for each user, a user may adjust the Tv value corresponding to the limit of the image blur grade by manipulating the manipulating section. Moreover, the control section 11 may restrict the range adjustable by the user to between the ideal value or ideal range limit and the limit of the image blur grade stored in the memory.

Noise is generated, for example, in amplifying the imaging signal from the image sensor 16. The noise increases as the imaging sensitivity is increased, and therefore the appearance of an image (image quality) will degrade. In FIG. 2B, the horizontal axis represents the imaging sensitivity, in which the right side is the low sensitivity side and the left side is the high sensitive side. The ideal value of the noise grade is the minimum sensitivity value, while the limit of the grade is the sensitivity value when the viewer watches an image and feels uneasy about the noise of the image. The Sv value corresponding to the limit of the noise grade is stored in the memory in advance, which is later read from the memory by the control section 11 and is used as the limit of the noise grade. Furthermore, since the limit of the noise grade is sensory and differs for each user, a user may adjust the Sv value corresponding to the limit of the noise grade by manipulating the manipulating section. Moreover, the control section 11 may restrict the range adjustable by a user to the limit of the noise grade stored in the memory as the upper limit.

Next, the exposure control in the present embodiment will be described. As described above, in the present embodiment, using the difference ΔEv between an optimal exposure amount and an actual exposure amount and a limit of the grade of each exposure other than the aperture, the limit being defined under a predetermined condition, an exposure-controlled object (specifically, either of the aperture, shutter speed, or ISO sensitivity) controlled with a higher priority is determined.

That is, in the exposure control of the present embodiment, the following (1) to (3) are performed.

(1) Based on ΔEv, it is determined which to prioritize, "follow-up with Av (aperture)" or "follow-up with Sv (sensitivity) or Tv (shutter speed)".

(2) When the limit of the grade has been reached even if "follow-up with SV or Tv" is determined as the result of determination in the above-mentioned processing of (1), the exposure control is switched to "exposure follow-up with Av". For example, when the brightness of a subject continues to vary slowly, the exposure is followed up with Sv or Tv as much as possible, while when the grade limit of Sv or Tv has been reached during exposure follow-up, the exposure control is switched to "exposure follow-up with Av".

(3) When the exposure limit of Av has been exceeded after being switched to "exposure follow-up with Av" as the result of the above-mentioned processing of (2), the adverse effect of the grade associated with an increase in Sv or Tv is accepted and "exposure follow-up with SV or Tv" is performed again.

Next, the priority order of control of Av, Tv, and Sv in the exposure control operation when an S mode or a P mode is already set will be described by the use of FIG. 3 or FIG. 4. Note that, the S mode is the shutter speed priority mode, in which for the shutter speed (Tv) manually set by a user, the aperture value (Av) and ISO sensitivity (Sv) which provide an optimal exposure are calculated based on the brightness of an image to be captured and the exposure control is performed. Moreover, the P mode is the program mode, in which the aperture value (Av), shutter speed value (Tv), and ISO sensitivity (Sv) which provide an optimal exposure are calculated based on the brightness of an image to be captured and the exposure control is performed.

Figure 3:
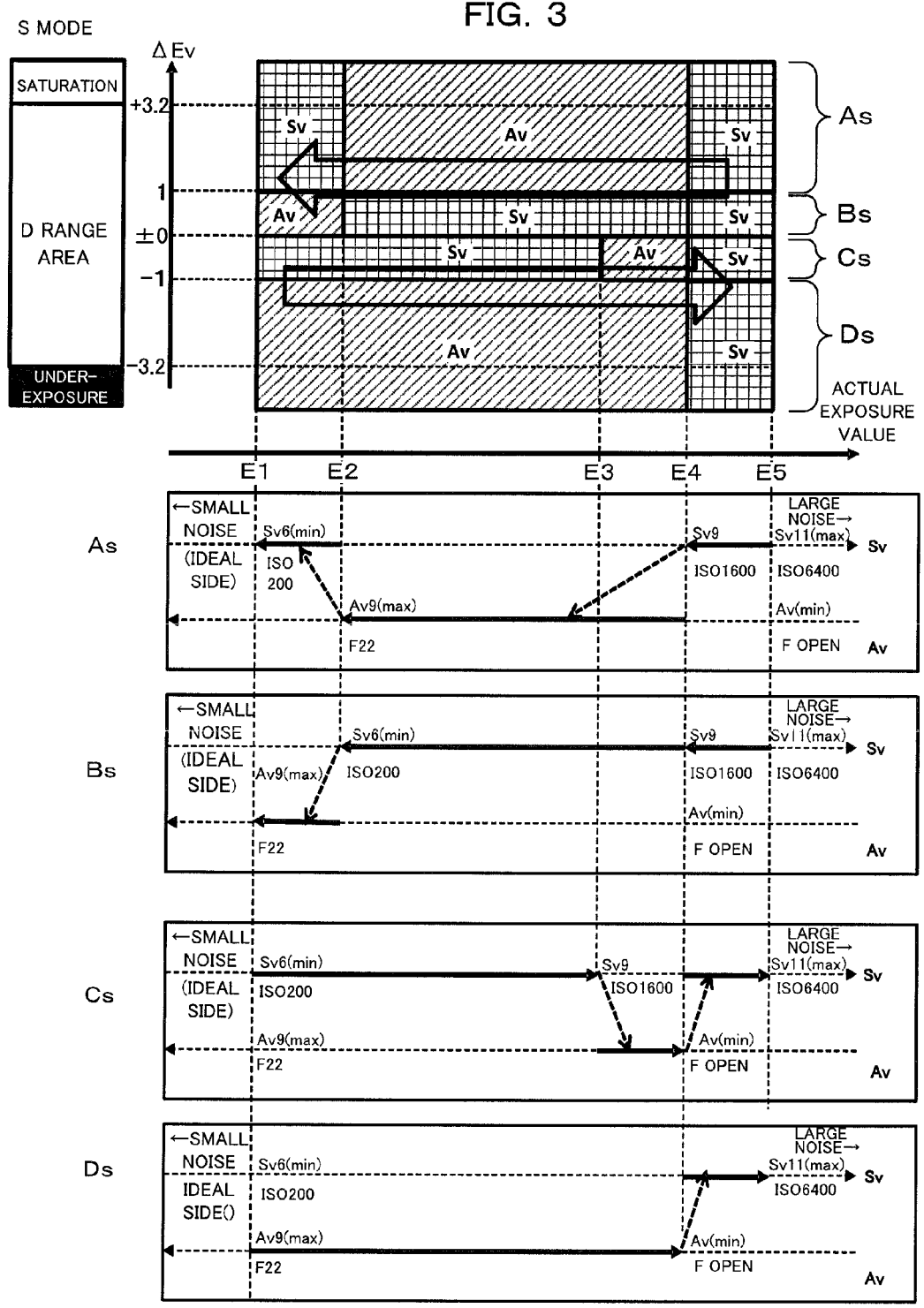
FIG. 3 illustrates how to control the exposure when a shutter speed priority mode is set in the camera according to an embodiment of the present invention.
Figure 4:
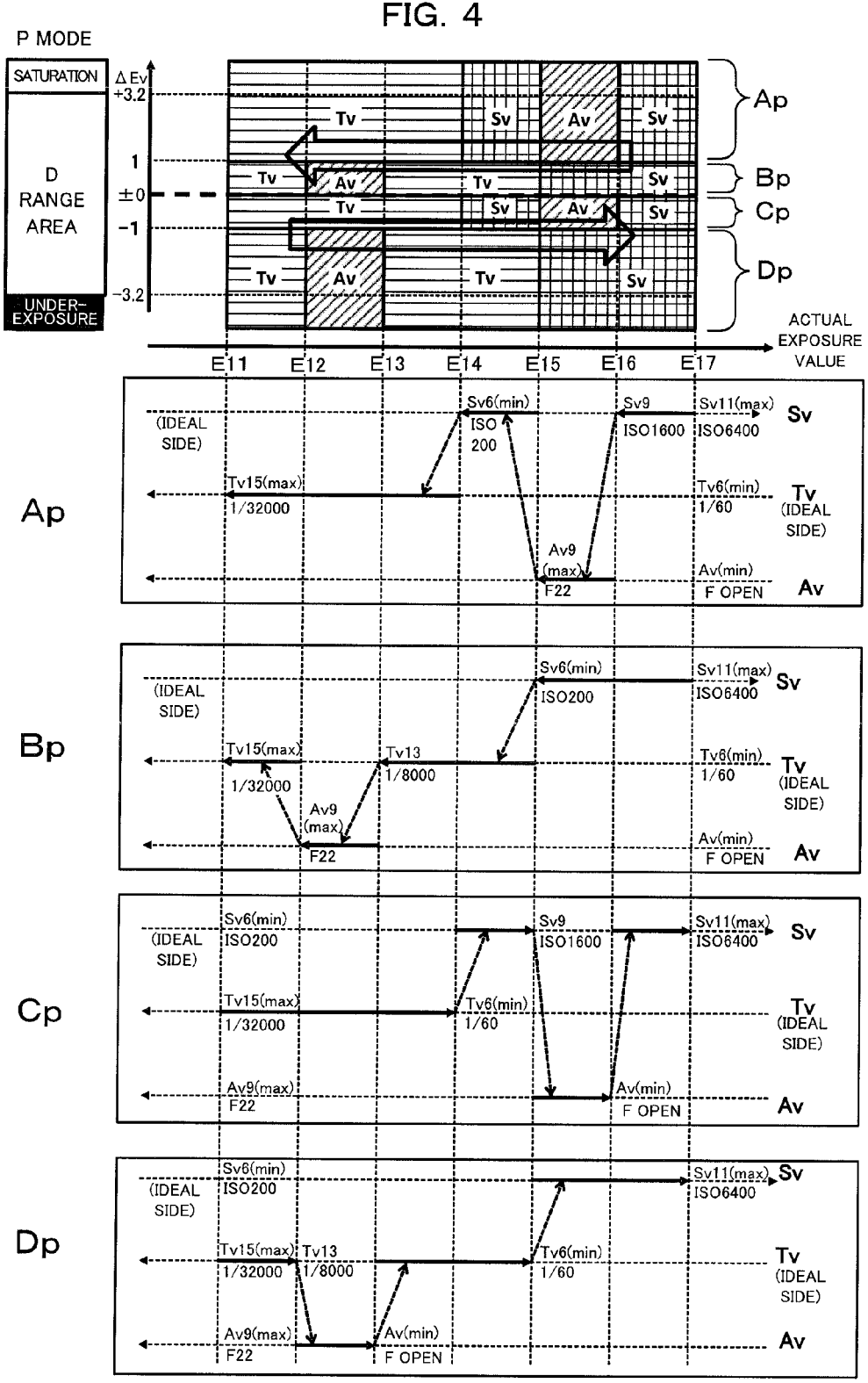
FIG. 4 illustrates how to control the exposure when a program mode is set in the camera according to an embodiment of the present invention.

In FIG. 3 and FIG. 4, the horizontal axis represents the actual exposure amount, while the vertical axis represents the deviation (ΔEv) between an actual exposure amount and an optimal exposure amount. In the present embodiment, which control to prioritize (Av control, or Sv control, or Tv control) varies depending on an actual exposure amount and the deviation ΔEv. Note that, in FIG. 3 and FIG. 4, although various numerical values and priorities are given, these are just an example and not limited thereto.

FIG. 3 illustrates the priority order of exposure controls when the S mode is set. The upper part of FIG. 3 illustrates the priority order of exposure controls in accordance with an actual exposure amount and the difference ΔEv. For example, when the deviation (ΔEV) is equal to or greater than 1 (see the range of As), this is the range in which the deterioration in the grade of a moving image is inconspicuous even if the aperture is moved. Therefore, if the ISO sensitivity Sv is within the limit of the grade and the aperture value Av is within the exposure limit, exposure follow-up with the aperture value Av will be performed with a higher priority (the slashed range in FIG. 3).

Moreover, when the deviation (ΔEv) is within a predetermined range (see the range from +1 to 0, Bs, in the example of FIG. 3), the exposure amount is close to the optimal exposure amount, and a deterioration in the grade of a moving image becomes conspicuous if the aperture is moved. Therefore, the exposure follow-up with the ISO sensitivity Sv is performed with a higher priority until the ISO sensitivity Sv becomes the exposure limit (E2 in the drawing) (in FIG. 3, the range with a lattice pattern).

Furthermore, when the deviation (ΔEv) is within a predetermined range (in the example of FIG. 3, see the range from 0 to −1, Cs), a deterioration in the grade of a moving image becomes conspicuous if the aperture is moved. Therefore, the exposure follow-up with ISO sensitivity Sv is prioritized until the ISO sensitivity Sv becomes the limit (in the drawing, E3) of the noise grade. Subsequently, exposure follow-up with the aperture value Av is performed until the ISO sensitivity Sv reaches the limit (E4 in the drawing) of the noise grade. Then, once the aperture value Av further reaches the exposure limit (E5 in the drawing), the exposure follow-up with the ISO sensitivity Sv will be performed, and the exposure follow-up will be performed until the maximum value (SvMAX) of the ISO sensitivity Sv is reached.

In addition, when the deviation (ΔEv) is outside a predetermined range (in the example of FIG. 3, see the range equal to or less than −1, Ds), the deviation of exposure is large. Therefore, this is a range in which a deterioration in the grade of a moving image is inconspicuous even if the aperture is moved. As the result, if the aperture value Av is within the exposure limit (E4 in the drawing), exposure follow-up with the aperture value Av will be performed with a higher priority.

The lower part of FIG. 3 illustrates, for each deviation (ΔEv), changes in the priority order of exposure controls. The part denoted by As illustrates an example when the deviation (ΔEv) is equal to or greater than 1. In this example, in the range from the actual exposure E5 to the actual exposure E4, the control is performed so as to obtain an optimal exposure by changing the ISO sensitivity Sv. That is, the exposure control is performed within the range from ISO sensitivity Sv=11 (max, ISO6400) to ISO sensitivity Sv=9 (the limit (E4 in the drawing) of the noise grade, ISO1600).

In the part of As of FIG. 3, in this example, in the range from the actual exposure E4 to the actual exposure E2, the control is performed so as to obtain an optimal exposure by changing the aperture value Av. That is, the exposure control is performed within the range of the aperture value Av from the open aperture Av to the maximum aperture value. That is, the exposure control is performed within the range from the open aperture Av (min) to Av=9 (max, F22).

In the part of As of FIG. 3, in this example, in the range from the actual exposure E2 to the actual exposure E1, the control is performed so as to obtain an optimal exposure by changing the ISO sensitivity Sv. That is, the exposure control is performed within the range from ISO sensitivity Sv=9 (the limit of the noise grade, ISO1600) to ISO sensitivity Sv=6 (min, ISO200).

The lower part denoted by Bs in FIG. 3 illustrates an example when the deviation (ΔEv) is 0 to +1. In this example, in the range from the actual exposure E5 to the actual exposure E2, the control is performed so as to obtain an optimal exposure by changing the ISO sensitivity Sv. That is, the exposure control is performed within the range from ISO sensitivity Sv=11 (max, ISO6400) to ISO sensitivity Sv=6 (min, ISO200).

In the part of Bs of FIG. 3, in this example, in the range from the actual exposure E2 to the actual exposure E1, the control is performed so as to obtain an optimal exposure by changing the aperture value Av. That is, the exposure control is performed within the range of the aperture value Av from the open aperture Av to the maximum aperture value. That is, the exposure control is performed within the range from the open aperture Av (min) to Av=9 (max, F22).

The lower part denoted by Cs illustrates an example when the deviation (ΔEv) is 0 to −1. In this example, in the range from the actual exposure E1 to the actual exposure E3, the control is performed so as to obtain an optimal exposure by changing the ISO sensitivity Sv. That is, the exposure control is performed within the range from ISO sensitivity Sv=6 (min, ISO200) to ISO sensitivity Sv=9 (the limit of the noise grade (E3 in the drawing), ISO1600).

In the part of Cs of FIG. 3, in this example, in the range from the actual exposure E3 to the actual exposure E4, the control is performed so as to obtain an optimal exposure by changing the aperture value Av. That is, the exposure control is performed within the range of the aperture value Av from the maximum aperture value to the open aperture Av. That is, the exposure control is performed within the range from Av=9 (max, F22) to the open aperture Av (min).

In the part of Cs of FIG. 3, in this example, in the range from the actual exposure E4 to the actual exposure E5, the control is performed so as to obtain an optimal exposure by changing the ISO sensitivity Sv. That is, the exposure control is performed within the range from ISO sensitivity Sv=9 (the limit of the noise grade, ISO1600) to ISO sensitivity Sv=11 (max, ISO6400).

The lower part denoted by Ds of FIG. 3 illustrates an example when the deviation (ΔEv) is equal to or less than −1. In this example, in the range from the actual exposure E1 to the actual exposure E4, the control is performed so as to obtain an optimal exposure by changing the aperture value Av. That is, the exposure control is performed within the range of the aperture value Av from the maximum aperture value to the open aperture Av. That is, the exposure control is performed within the range from Av=9 (max, F22) to the open aperture Av (min).

In the part of Ds of FIG. 3, in this example, in the range from the actual exposure E4 to the actual exposure E5, the control is performed so as to obtain an optimal exposure by changing the ISO sensitivity Sv. That is, the exposure control is performed within the range from ISO sensitivity Sv=6 (min, ISO200) to ISO sensitivity Sv=11 (max, ISO6400).

FIG. 4 illustrates the priority order of exposure control when the P mode is set. The upper part of FIG. 4 illustrates the priority order of exposure controls in accordance with an actual exposure amount and the difference ΔEv. For example, when the deviation is equal to or greater than 1 (see the range of Ap), as in the case of the S mode, this is a range in which a deterioration in the grade of a moving image is inconspicuous even if the aperture is moved. Therefore, if the ISO sensitivity Sv is within the limit of the grade and the aperture value Av is within the exposure limit, "exposure follow-up with the aperture value Av" will be performed with a higher priority (the slashed range in FIG. 4).

Further, when the deviation (ΔEv) is within a predetermined range (see the range from +1 to 0, Bp, in the example of FIG. 4), the exposure amount is close to the optimal exposure amount, and a deterioration in the grade of a moving image becomes conspicuous if the aperture is moved. Therefore, the exposure follow-up with the ISO sensitivity Sv or shutter speed Tv is performed with a higher priority until the ISO sensitivity Sv becomes the exposure limit (in FIG. 4 the range with a lattice pattern or a horizontally-striped pattern).

Furthermore, when the deviation (ΔEv) is within a predetermined range (in the example of FIG. 4, see the range from 0 to −1, Cp), a deterioration becomes conspicuous if the aperture is moved. Therefore, the exposure follow-up with the ISO sensitivity Sv or shutter speed Tv is prioritized until the ISO sensitivity Sv and shutter speed Tv become the limit of the grade. Subsequently, when the aperture value Av reaches the exposure limit, the exposure follow-up is performed until the maximum value (SvMAX) of the ISO sensitivity Sv or the maximum value of the shutter speed Tv is reached.

Moreover, when the deviation (ΔEv) is outside a predetermined range (in the example of FIG. 4, see the range equal to or less than −1, Dp), this is a range in which a deterioration in the grade of a moving image is inconspicuous even if the aperture is moved. Therefore, as in the case of FIG. 3, if the aperture value Av is within the exposure limit, exposure follow-up with the aperture value Av will be performed with a higher priority.

The lower part of FIG. 4 illustrates, for each deviation (ΔEv), changes in the priority order of exposure controls. Note that, the further to the left side in the drawing, the smaller the noise, the smaller the image blur, and the larger the flicker become. On the contrary, the further to the right side in the drawing, the larger the noise, the larger the image blur, and the smaller the flicker become.

The part denoted by Ap illustrates an example when the deviation (ΔEv) is equal to or greater than 1. In this example, in the range from the actual exposure E17 to the actual exposure E16, the control is performed so as to obtain an optimal exposure by changing the ISO sensitivity Sv. Moreover, in the range from the actual exposure E16 to the actual exposure E15, the control is performed so as to obtain an optimal exposure by changing the aperture value Av. Note that Sv9 (E16) is the limit of the noise grade. Av (min) is the open F value.

In the part of Ap of FIG. 4, in this example, in the range from the actual exposure E15 to the actual exposure E14, the control is performed so as to obtain an optimal exposure by changing the ISO sensitivity Sv. Moreover, in the range from the actual exposure E14 to the actual exposure E11, the control is performed so as to obtain the optimal exposure by changing the shutter speed Tv. That is, the exposure control is performed within the range from shutter speed Tv=6 (min, 1/60) to shutter speed Tv=15 (max, 1/32000).

The lower part denoted by Bp in FIG. 4 illustrates an example when the deviation (ΔEv) is 0 to +1. In this example, in the range from the actual exposure E17 to the actual exposure E15, the control is performed so as to obtain an optimal exposure by changing the ISO sensitivity Sv. Moreover, in the range from the actual exposure E15 to the actual exposure E13, the control is performed so as to obtain an optimal exposure by changing the shutter speed Tv. That is, the exposure control is performed within the range from shutter speed Tv=6 (min, 1/60) to shutter speed Tv=13 (the limit (E13) of the image blur grade, 1/8000). Note that, when the flicker is being detected, the Tv corresponding to the limit of the flicker grade may be employed as the limit of the image blur grade.

In Bp of the lower part of FIG. 4, in this example, in the range from the actual exposure E13 to the actual exposure E12, the control is performed so as to obtain an optimal exposure by changing the aperture value Av. Moreover, in the range from the actual exposure E12 to the actual exposure E11, the control is performed so as to obtain the optimal exposure by changing the shutter speed Tv. That is, the exposure control is performed within the range from shutter speed Tv=13 (the limit (E13) of the image blur grade, 1/8000) to shutter speed Tv=15 (max, 1/32000).

The lower part denoted by Cp of FIG. 4 illustrates an example when the deviation (ΔEv) is 0 to −1. In this example, in the range from the actual exposure E11 to the actual exposure E14, the control is performed so as to obtain an optimal exposure by changing the shutter speed Tv. That is, the exposure control is performed within the range from shutter speed Tv=15 (max, 1/32000) to shutter speed Tv=6 (min, 1/60).

In Cp of the lower part of FIG. 4, in the range from the actual exposure E14 to the actual exposure E15, the control is performed so as to obtain an optimal exposure by changing the ISO sensitivity Sv. That is, the exposure control is performed within the range from ISO sensitivity Sv=6 (min, ISO200) to ISO sensitivity Sv=9 (the limit (E15) of the noise grade, ISO1600).

In Cp of the lower part of FIG. 4, in the range from the actual exposure E15 to the actual exposure E16, the control is performed so as to obtain an optimal exposure by changing the aperture value Av. That is, the exposure control is performed within the range from Av=9 (max, F22) to the open aperture Av (min).

In Cp of the lower part of FIG. 4, in the range from the actual exposure E16 to the actual exposure E17, the control is performed so as to obtain an optimal exposure by changing the ISO sensitivity Sv. That is, the exposure control is performed within the range from ISO sensitivity Sv=9 (the limit (E15) of the noise grade, ISO1600) to ISO sensitivity Sv=11 (max, ISO6400).

The lower part denoted by Dp of FIG. 4 illustrates an example when the deviation (ΔEv) is equal to or less than −1. In this example, in the range from the actual exposure E11 to the actual exposure E12, the control is performed so as to obtain an optimal exposure by changing the shutter speed Tv. That is, the exposure control is performed within the range from shutter speed Tv=15 (max, 1/32000) to shutter speed Tv=13 (the limit (E12) of the grade of the image blur, 1/8000). Note that, when the flicker is being detected, the Tv corresponding to the limit of the flicker grade may be employed as the limit of the image blur grade.

In Dp of the lower part of FIG. 4, in the range from the actual exposure E12 to the actual exposure E13, the control is performed so as to obtain an optimal exposure by changing the aperture value Av. That is, the exposure control is performed within the range from Av=9 (max, F22) to the open aperture Av (min).

In Dp of the lower part of FIG. 4, in the range from the actual exposure E13 to the actual exposure E14, the control is performed so as to obtain an optimal exposure by changing the shutter speed Tv. That is, the exposure control is performed within the range from shutter speed Tv=13 (the limit (E12) of the image blur grade, 1/8000) to shutter speed Tv=6 (min, 1/60).

In Dp of the lower part of FIG. 4, in the range from the actual exposure E15 to the actual exposure E17, the control is performed so as to obtain an optimal exposure by changing the ISO sensitivity Sv. That is, the exposure control is performed within the range from ISO sensitivity Sv=6 (min, ISO200) to ISO sensitivity Sv=11 (max, ISO6400).

Next, using the flow chart illustrated in FIG. 5, how to determine the priority order of exposure follow-up controls when the S mode is set will be described. In this flow chart, the control to achieve the priority order of exposure controls in the S mode illustrated in FIG. 3 is performed. Note that this flow chart (the flow charts of FIG. 6 and FIG. 7 described later, as well) is performed by the CPU inside the control section 11 which controls each section inside the camera in accordance with a program stored in the memory.

Entering the flow illustrated in FIG. 5, the deviation ΔEv is first calculated (S1). Here, the exposure setting value calculation section 12 calculates the difference (i.e., the actual exposure amount—the optimal exposure amount) between an actual exposure amount calculated based on the set aperture value, ISO sensitivity, and shutter speed and an optimal exposure amount calculated based on a target brightness input from the imaging control section 15.

Once ΔEV is calculated, it is then determined whether or not ΔEv is larger than 0 (S3). Here, it is determined based on ΔEv calculated in step S1. The range in which ΔEv is larger than 0 corresponds to the area above ±0 in the graph of the upper part of FIG. 3.

If ΔEv is larger than 0 as the result of the determination in step S3, it is then determined whether or not ΔEv is larger than 1 (S5). Here, it is determined based on ΔEv calculated in step S1. The range in which ΔEv is larger than 0 corresponds to the area (see the range of As) above 1 in the graph of the upper part of FIG. 3.

If ΔEv is larger than 1 as the result of the determination in step S5, it is determined whether or not Sv is "within the limit of the grade" (S7). This case corresponds to the movement in the part designated by As of FIG. 3. Since the exposure amount deviates from an optimal exposure amount, this is the area in which the flicker of an image is inconspicuous even if the exposure control is performed with the aperture value. In this area, Av or Sv is selected taking into consideration the grade limit of Sv (see E4). In the example illustrated in FIG. 3, the limit of the grade is set as Sv=9. In step S7, based on an automatically-set ISO sensitivity Sv, it is determined whether or not ISO sensitivity Sv<9, i.e., whether or not the sensitivity is lower than ISO1600.

If Sv is "within the limit of the grade" as the result of the determination in step S7, it is then determined whether or not the aperture value Av is larger than the maximum value (S9). Here, it is determined based on the automatically-set aperture value Av.

If Av<max as the result of the determination in step S9, the exposure follow-up is performed with the aperture value Av (S11). In this case, because ΔEv is larger than 1 (see S5) and the aperture value Av is in the range from the open aperture value (min) to the maximum aperture value (max), the exposure is controlled using the aperture value. Here, performing the exposure follow-up with Av means that the aperture Av is changed so as to obtain an optimal exposure amount when the brightness of an image to be captured has changed.

Further, if not Av<max as the result of the determination in step S9 or if Sv is not "within the limit of the grade" as the result of the determination in step S7, the exposure follow-up is performed with the ISO sensitivity Sv (S13). If not Av<max in step S9, the exposure is controlled with the ISO sensitivity Sv because the aperture becomes the minimum aperture opening and the aperture value Av is not within the control range. Moreover, if Sv is not "within the limit of the grade" in step S7, the noise is large due to a high ISO, and therefore the exposure is controlled so as to lower the ISO sensitivity Sv, with priority given to reduction of the noise and dissolve ΔEv. Here, performing the exposure follow-up with Sv means that the ISO sensitivity Sv is changed so as to obtain an optimal exposure amount when the brightness of an image to be captured has changed.

Returning to step S5, if ΔEv is not larger than 1 as the result of the determination in this step, it is then determined whether or not Sv≤min (S15). This case corresponds to the movement in the part designated by Bs of FIG. 3. The case where it is determined as "No" in step S5 is the case where ΔEv is between 0 and +1 and is the case where the exposure control has been performed to obtain an exposure amount close to the optimal exposure amount. In this case, as described above, in the exposure control with the aperture 27 (Av), flicker is generated in the image and thus the appearance of the image will degrade. Therefore, the exposure control with the ISO sensitivity Sv is prioritized. In step S15, it is determined whether or not the automatically-set ISO sensitivity Sv is smaller than the minimum value (min), i.e., Sv=6, ISO200 in the example of FIG. 3.

If Sv is equal to or less than the minimum value (min) as the result of the determination in step S15, the exposure follow-up is performed with the aperture value Av (S17). Because the ISO sensitivity Sv cannot be reduced any more, the exposure control is performed with the aperture value Av.

On the other hand, if Sv is not equal to or less than the minimum value (min) as the result of the determination in step S15, the exposure follow-up is performed with the ISO sensitivity Sv (S19). Taking into consideration prevention of the flicker of an image, the exposure follow-up with the aperture value Av is not performed, but the exposure follow-up is performed with the ISO sensitivity Sv.

Returning to step S3, if not ΔEv>0 as the result of the determination in this step, it is then determined whether or not ΔEv is smaller than −1 (S21). Here, it is determined based on ΔEv calculated in step S1. The range in which ΔEv is smaller than −1 corresponds to the area below −1 in the graph of the upper part of FIG. 3.

If not ΔEv<−1 as the result of the determination in step S21, it is determined whether or not Sv is "outside the limit of the grade" (S23). This case corresponds to the movement in the part designated by Cs of FIG. 3. The case where it is determined as "No" in step S21 is the case where ΔEv is between 0 and −1 and is the case where the exposure control has been performed to obtain an exposure amount close to the optimal exposure amount. In this case, as described above, in the exposure control with the aperture 27 (Av), flicker is generated in the image and thus the appearance of the image will degrade. Therefore, the exposure control with the ISO sensitivity Sv is prioritized. In step S23, it is determined whether or not the automatically-set ISO sensitivity Sv is outside the limit of the grade (see E3), i.e., whether or not it is larger than Sv=9, ISO1600 in the example of FIG. 3.

If Sv is "outside the limit of the grade" as the result of the determination in step S23, it is then determined whether or not the aperture value Av is larger than the minimum value (min) (S25). Here, it is determined whether or not the automatically-set aperture value Av is larger than the open aperture value (min).

If the aperture value Av is larger than the open aperture value (min) as the result of the determination in step S25, the exposure follow-up is performed with Av (S27). Since Sv is at the limit of the grade, an optimal exposure is obtained by changing the aperture value Av. However, once the aperture value Av reaches the open aperture value, the exposure follow-up with Sv is performed (S25, see S29).

On the other hand, if Sv is not "outside the limit of the grade" as the result of the determination in step S23 or if the aperture value Av is equal to or less than the minimum value (min) as the result of the determination in step S25, the exposure follow-up is performed with Sv (S29). In this case, since the exposure amount is close to the optimal exposure amount, the optimal exposure is attempted to be obtained by the exposure control with Sv without performing the exposure follow-up with the aperture Av.

Returning to step S21, if ΔEv<−1 as the result of the determination in this step, it is then determined whether or not Av>min (S31). This case corresponds to the movement in the part designated by Ds of FIG. 3. Since the exposure amount deviates from an optimal exposure amount, this is the area in which the flicker of an image is inconspicuous even if the exposure control is performed with the aperture value. In this area, the exposure control with the aperture 27 is performed until the aperture value Av reaches the open aperture value.

If Av>min as the result of the determination in step S31, the exposure follow-up is performed with Av (S33). On the other hand, if not Av>min as the result of the determination, the exposure follow-up is performed with Sv (S35) because the aperture is opened and the exposure follow-up cannot be performed with the aperture Av.

As described above, when the S mode is set, the area is classified into four areas of As to Ds of FIG. 3 based on the difference between an actual exposure amount and an optimal exposure amount, and the exposure control is performed in each area. In this case, in the range in which ΔEv is within ±1, the exposure control with Sv is prioritized, while in the range in which ΔEv is outside ±1, the exposure control with Av is prioritized.

Then, how to determine the priority order of exposure follow-up controls when the P mode is set will be described by the use of the flow chart illustrated in FIG. 6. In this flow chart, the control so as to obtain the priority order of exposure controls in the P mode illustrated in FIG. 4 is performed.

Entering the flow illustrated in FIG. 6, the deviation ΔEv is first calculated (S41), as in step S1. Here, the exposure setting value calculation section 12 calculates the difference (i.e., an actual exposure amount—an optimal exposure amount) between an actual exposure amount calculated based on the set aperture value, ISO sensitivity, and shutter speed and an optimal exposure amount calculated based on the brightness of an image input from the imaging control section 15.

Once ΔEV is calculated, it is then determined whether or not ΔEv is larger than 0 (S43), as in step S3. Here, it is determined based on ΔEv calculated in step S1. The range in which ΔEv is larger than 0 corresponds to the area above ±0 in the graph of the upper part of FIG. 4.

If ΔEv is larger than 0 as the result of the determination in step S43, it is then determined whether or not ΔEv is larger than 1 (S45). Here, it is determined based on ΔEv calculated in step S41. The range in which ΔEv is larger than 0 corresponds to the area above 1 in the graph of the upper part of FIG. 4. The case where ΔEv is larger than 1 corresponds to the movement in the part designated by Ap of FIG. 4. Since the exposure amount deviates from an optimal exposure amount, this is the area in which the flicker of an image is inconspicuous even if the exposure control is performed with the aperture value. However, as compared with the case of the S mode, the shutter speed Tv can be also used for exposure control, and therefore the parameters other than the aperture 27 have also a wide range in which the grade of an image will not degrade. In this area, taking into consideration the grade limit of Sv and the maximum aperture value (max) of the aperture value Av, either of Av, Sv, or Tv is selected.

If ΔEv is larger than 1 as the result of the determination in step S45, it is then determined whether or not Sv is "within the limit of the grade" (S47), as in step S7. In the example illustrated in FIG. 4, the limit of the grade of Sv is set as Sv=9. In step S47, based on the ISO sensitivity Sv manually set by a user or the automatically-set ISO sensitivity Sv, it is determined whether or not ISO sensitivity Sv<9, i.e., whether or not the sensitivity is lower than ISO1600.

If Sv is "within the limit of the grade" as the result of the determination in step S47, it is then determined whether or not Av<max (S49). In the example illustrated in FIG. 4, the max of Av is set as Av=9 (F22).

If Av<max as the result of the determination in step S49, the exposure follow-up is performed with Av (S51). Since the automatically-set aperture value is smaller than the maximum aperture value, i.e., is a value on the more opened side, the exposure control is performed by narrowing the aperture 27.

On the other hand, if not Av<max as the result of the determination in step S49, it is then determined whether or not Sv≤min (S53). If Sv≤min as the result of this determination, the exposure follow-up is performed with Tv (S55). An optimal exposure will not be obtained unless the aperture is further narrowed down from the maximum aperture value (max) and the ISO sensitivity is also further reduced from the minimum ISO sensitivity. Therefore, here, an optimal exposure is obtained by controlling the shutter speed Tv. Here, performing the exposure follow-up with Tv means that the electronic shutter speed Tv of the image sensor 16 is changed so as to obtain an optimal exposure amount when the brightness of an image to be captured has changed.

If not Sv≤min as the result of the determination in step S53 or if Sv is not "within the limit of the grade" as the result of the determination in step 47, the exposure follow-up is performed with Sv (S57). Since the ISO sensitivity Sv is outside the limit of the grade but has not reached the max of Sv, an optimal exposure is obtained by controlling Sv.

Returning to step S45, if not ΔEv>1 as the result of the determination in this step, it is then determined whether or not Sv≤min (S61). This case corresponds to the movement in the part designated by Bp of FIG. 4. The case where it is determined as "No" in step S45 is the case where ΔEv is between 0 and +1 and is the case where the exposure control has been performed to obtain an exposure amount close to the optimal exposure amount. In this case, as described above, in the exposure control with the aperture 27 (aperture value Av), flicker is generated in the image and thus the appearance of the image will degrade. Therefore, the exposure control with the ISO sensitivity Sv or shutter speed Tv is prioritized. In step S61, it is determined whether or not the automatically-set ISO sensitivity Sv is smaller than the minimum value (min), i.e., Sv=6, ISO200 in the example of FIG. 4.

If Sv≤min as the result of the determination in step S61, it is then determined whether or not Tv is "outside the limit of the grade" (S63). In the example illustrated in FIG. 4, Tv=13 and the shutter speed 1/8000 are set as the limit of the image blur grade. In this step, it is determined based on the shutter speed which the exposure setting value calculation section 12 has automatically set in order to obtain an optimal exposure amount.

If Tv is "outside the limit of the grade" as the result of the determination in step S63, it is then determined whether or not Av<max (S65). Here, since Tv is outside the limit of the grade, it is determined whether or not Av is within the controllable range. In the example illustrated in FIG. 4, the max of the aperture value Av is set as Av=9 (F22, the maximum aperture value).

If Av<max as the result of the determination in step 65, the exposure follow-up is performed with Av (S67). Since the aperture 27 is within the controllable range, the exposure control is performed with the aperture value Av of the aperture 27.

On the other hand, if not Av<max as the result of the determination in step S65 or if Tv is not "outside the limit of the grade" as the result of the determination in step S63, the exposure follow-up is performed with Tv (S69). Here, if TV is "outside the limit of the grade" in step S63 and if not Av<max in step S65, the control range with the aperture 27 is exceeded. Therefore, the exposure control is performed with Tv even if TV is outside the grade limit. Moreover, since the grade of Tv is within the limit, the exposure control is performed with the shutter speed Tv.

Returning to step S61, if not Sv≤min as the result of this determination, the exposure follow-up is performed with Sv (S71). As the results of the determination of step S43 and step S45, the exposure amount is within a range close to an optimal exposure amount. Also, as the result of the determination of step S61, the ISO sensitivity Sv can be controlled at a sensitivity higher than the minimum ISO sensitivity. Then, the exposure control is performed so as to obtain an optimal exposure with the ISO sensitivity Sv without moving the aperture 27.

Returning to step S43, if not ΔEv>0 as a result of determination of this step, it is then determined whether or not ΔEV<−1 (S75). Here, it is determined based on ΔEv calculated in step S41. The range in which ΔEv is smaller than −1 corresponds to the area below −1 in the graph of the upper part of FIG. 4.

If ΔEv<−1 as the result of the determination in step S75, it is determined whether or not Tv is "outside the limit of the grade" (S77). This case corresponds to the movement in the part designated by Dp of FIG. 4. Since the exposure amount deviates significantly from an optimal exposure amount, this is the area in which the flicker of an image is inconspicuous even if the exposure control is performed with the aperture value Av. In this area, the exposure control with the aperture 27 is performed until the aperture value Av reaches the open aperture value. However, as compared with the case of the S mode, the shutter speed Tv can be also used for exposure control, and therefore the parameters other than the aperture 27 have also a wide range in which the grade of an image will not degrade. In this area, taking into consideration the grade limit of Sv and the maximum aperture value (max) of the aperture value Av, either of Av, Sv, or Tv is selected.

In step S77, in the example illustrated in FIG. 4, using Tv=13 (shutter speed 1/8000) as the grade of Tv and as the limit of the image blur grade, the exposure setting value calculation section 12 determines based on the automatically-set shutter speed.

If Tv is not "outside the limit of the grade" as the result of the determination in step S77, i.e., if Tv is "within the limit of the grade", it is then determined whether or not Av>min (S79). Here, it is determined whether or not the aperture value Av automatically set is within the controllable range of the aperture 27. In the example illustrated in FIG. 4, the min of Av is set to the open aperture value (F open).

If Av>min as the result of the determination in step S79, the exposure follow-up operation is performed with Av (S81). Since the exposure control with the aperture value is possible, the exposure control is performed with the aperture 27.

On the other hand, if not Av>min as the result of the determination in step S79, it is determined whether or not Tv≤min (S83). In the example illustrated in FIG. 4, Tv=min is set as Tv=6 (shutter speed 1/60). In the present embodiment, the frame rate for imaging is set to 60 fps. If the shutter speed Tv is made slower (TV<6) than 1/60 (Tv=6) which is the shutter speed in synchronization with 60 fps, frame drop will occur which is a state unable to correspond to 60 fps. In the present embodiment, in order to prevent the frame drop, the shutter speed is set so as not to become slower than 1/60 (so as not to become TV<6).

If Tv≤min as the result of the determination in step S83, the exposure follow-up is performed with Sv (S85). Here, the exposure control is performed with the ISO sensitivity Sv.

On the other hand, if not Tv≤min as the result of the determination in step S83 or if Tv is "outside the limit of the grade" as the result of determination in step S77, the exposure follow-up is performed with Tv (S87). Here, the exposure control is performed with the shutter speed Tv.

Returning to step S75, if not ΔEv<−1 as the result of the determination in this step, it is determined whether or not Tv≤min (S89). This case corresponds to the movement in the part designated by Cp of FIG. 4. From the results of the determination in step S43 and step S75, this is the case where ΔEv is between 0 and −1 and is the case where the exposure control close to an optimal exposure amount is performed. In this case, as described above, in the exposure control with the aperture 27, flicker is generated in the image and thus the appearance of the image will degrade. Therefore, the exposure control with the ISO sensitivity Sv or shutter speed Tv is prioritized. In step S89, it is determined whether or not the automatically-set shutter speed Tv is slower than the longest shutter speed (min), i.e., whether or not it is smaller than Tv6 (shutter speed 1/60) in the example of FIG. 4.

If Tv≤min as the result of the determination in step S89, it is determined whether or not Sv is "outside the limit of the grade" (S91). Here, it is determined whether or not Sv is outside the limit of the noise grade, i.e., whether or not it is larger than Sv=9, ISO1600 in the example of FIG. 4.

If Sv is "outside the limit of the grade" as the result of the determination in step S91, it is determined whether or not Av>min (S93). The min of Av is the open F value in the example illustrated in FIG. 4. If the Av value is larger than the open F value, the exposure control with the aperture 27 can be performed.

On the other hand, if Av is smaller than min as the result of the determination in step S93 or if Sv is not "outside the limit of the grade" as the result of the determination in step S91, the exposure follow-up is performed with Sv (S97). In this case, the exposure control is performed with the ISO sensitivity Sv.

Returning to step S89, if not Tv≤min as the result of the determination in this step, the exposure follow-up is performed with Tv (S99). In this case, since the shutter speed Tv is within the controllable range and an optimal exposure amount can be obtained, the exposure control is performed with the shutter speed Tv.

Figure 8:
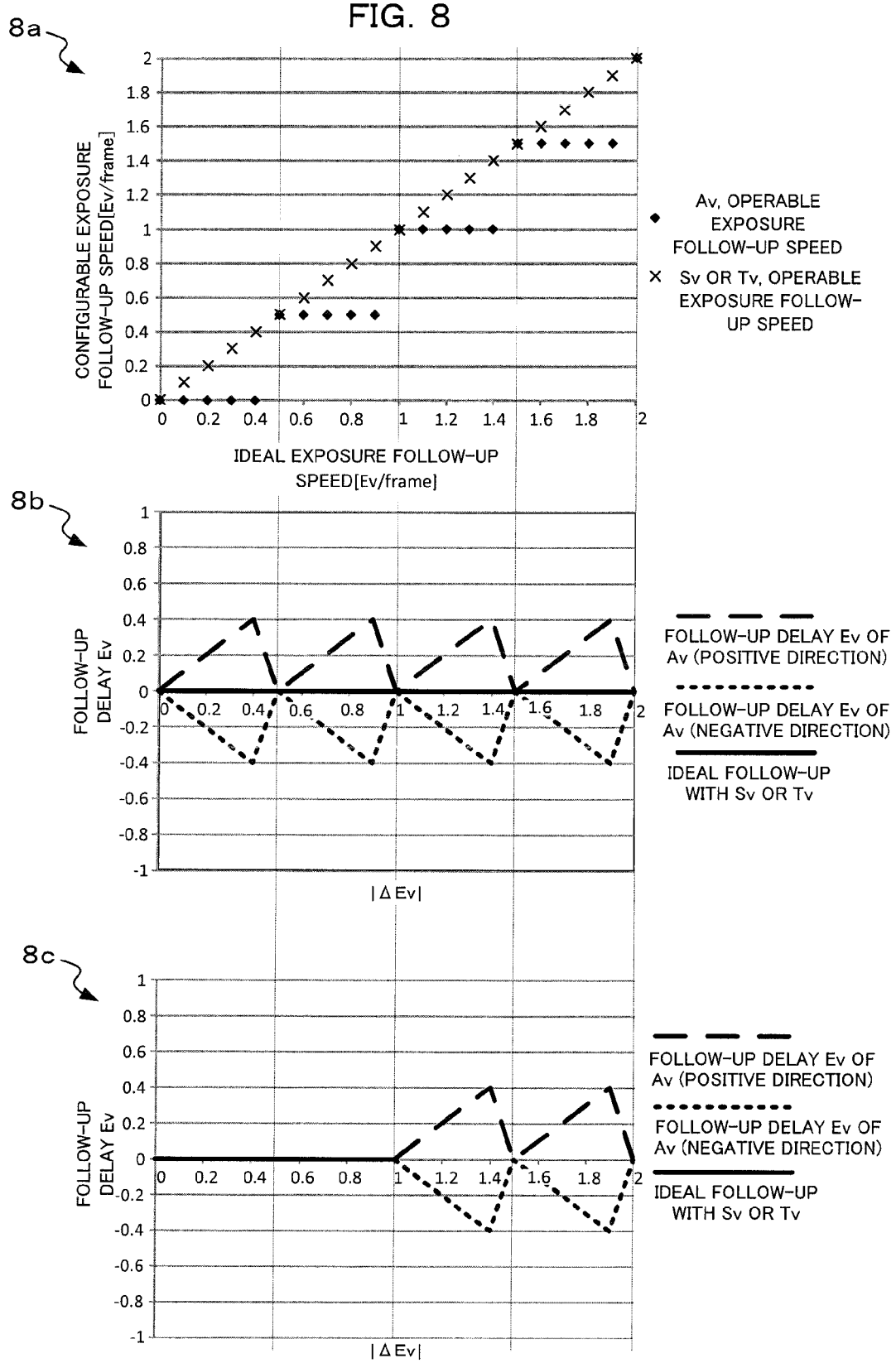
FIG. 8 illustrates the effects of the camera according to an embodiment of the present invention.

As described above, when the P mode is set, the area is classified into four areas of Ap to Dp of FIG. 4 based on the difference between an actual exposure amount and an optimal exposure amount and the exposure control is performed in each area. In this case, in the range in which ΔEv is within ±1, the exposure control with Sv or Tv is prioritized, while in the range in which ΔEv is outside of ±1, the exposure control with Av is prioritized Then, the operational effects of the present embodiment will be described by the use of FIG. 8. A graph 8a of the upper part of FIG. 8 illustrates the configurable exposure follow-up speed versus the exposure follow-up speed. The exposure follow-up speed indicates the change amount of exposure per frame. As can be seen from the graph 8a, the configurable exposure follow-up speed of each of the ISO sensitivity Sv and shutter speed Tv coincides with the exposure follow-up speed. Therefore, the ISO sensitivity Sv and shutter speed Tv calculated in the exposure setting calculation section 12 are accurately reflected on the exposure control.

However, the aperture value Av can take only discrete values because the adjusting amount of exposure cannot be set to 0.1 Ev due to the mechanism of the aperture. As the result, the configurable exposure follow-up speed of each of the ISO sensitivity Sv and shutter speed Tv does not coincide with the exposure follow-up speed. Therefore, the aperture value Av calculated in the exposure setting calculation section 12 is not accurately reflected in controlling the aperture 27.

A graph 8b in the middle of FIG. 8 indicates the amount of follow-up delay of the aperture. The horizontal axis represents the absolute value |ΔEv| of the deviation of the exposure from the point of origin, while the vertical axis represents, as the amount of follow-up delay, the result of performing the exposure control to dissolve ΔEv (difference between an actual exposure amount and an optimal exposure amount). As described above, since the aperture value Av can be controlled only with discrete values, a period will occur in which the aperture 27 cannot be controlled with the aperture value Av calculated in the exposure setting calculation section 12. Therefore, as illustrated in the graph 8b, a follow-up delay will occur. That is, there is always a certain amount of deviation involved with respect to the optimal exposure amount (in the drawing, the ideal follow-up is indicated by a solid line).

Then, in the present embodiment, in the range in which the actual exposure amount is close to the optimal exposure amount, the control with the aperture 27 will not be performed as much as possible, but the control is performed so that an optimal exposure is obtained with only the ISO sensitivity Sv or with the ISO sensitivity Sv and shutter speed Tv. A graph 8c in the lower part of FIG. 8 illustrates an example of the control in the present embodiment, in which when ΔEv (deviation between the actual exposure amount and the optimal exposure amount) is within 1, the ideal follow-up is achieved by avoiding the exposure control with the aperture 27. A follow-up delay occurs when ΔEv is equal to or larger than 1, but in the area where ΔEv is large, a user is not likely to be aware of the flicker of an image and therefore is not annoyed by a deterioration of the image.

As described above, in an embodiment of the present invention, the following steps are performed: an exposure deviation calculation step of calculating, based on an imaging signal output by the imaging section, a deviation between an optimal exposure amount and a currently set actual exposure amount (e.g., see S1 of FIG. 5 and S41 of FIG. 6); a first exposure control step of controlling the exposure of the imaging section by changing an opening of the aperture (e.g., see S11, S17, S27, S33, and the like of FIG. 5); a second exposure control step of controlling the exposure of the imaging section without changing the opening of the aperture (e.g., see S13, S19, S29, S35, and the like of FIG. 5); and a control step of selecting, based on the deviation, the first exposure control step or the second exposure control step to control exposure (e.g., see S3, S5, S21, and the like of FIG. 5). Therefore, even if the brightness of an image to be captured varies, the appearance of a moving image will not degrade. That is, in the present embodiment, depending on a case where the deviation is small or a case where it is large, it is determined whether the exposure control with the opening of the aperture is performed or the exposure control without the opening of the aperture is performed. Therefore, a deterioration of a moving image due to the flicker of the image can be prevented (see FIG. 8).

Note that, in an embodiment of the present invention, the number of area classifications by ΔEv is set to four, but may be three or may be more than four. Even in this case, in the range where ΔEv is small, the priority order of exposure controls by the aperture value may be lowered. Moreover, the threshold in classifying the area and the limit value of the grade are just an example, and may be appropriately changed depending on the design concept. Moreover, a difference between an actual exposure amount and an optimal exposure amount is calculated in calculating ΔEv, but not limited thereto, a difference between a target brightness and the brightness of an image to be captured may be calculated and the control may be performed based on this value.

Moreover, in an embodiment of the present invention, the CPU and the like in the control section 11 implement the exposure setting value calculation section 12, the shutter speed/sensitivity operation section 14, and the like. However, not limited thereto, all of or a part of each section in the control section 11 may be constituted by hardware, not to mention. Moreover, each section other than the control section 11 in the camera body 10 and each section in the lens barrel 20 may be constituted through software by a CPU and a program other than constituted by hardware circuitry and discrete components, or may be implemented by hardware, such as a gate circuit, which is generated based on a programming language described in Verilog, or may be implemented by a circuit performed by a program code of a DSP (Digital Signal Processor) or the like. These may be combined as needed, not to mention. Moreover, although the imaging control section 15 is constituted from hardware circuitry, a part of the function thereof may be performed through software by the control section 11 and the like.

In addition, description has been provided using a digital camera as an imaging device in the present embodiment, but as a camera, a digital single-lens reflex camera or a compact digital camera may be used, or a camera for capturing a moving image, such as a video camera or a movie camera, may be used, and further a camera may be also used which is incorporated into a mobile phone, a smartphone, a mobile information terminal, a personal computer (PC), a tablet type computer, a game device or the like. In any case, the present invention can be applicable to any device which performs, in shooting a moving image, the exposure control with an aperture.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A photographing apparatus, comprising:
   an imaging optical system,
   an image sensor which receives a light flux passing through the imaging optical system, captures an image, and outputs an imaging signal;
   an aperture which is included in the imaging optical system and which includes an opening to restrict the light flux;
   a controller which performs a first exposure control to control the exposure of the image sensor by changing the opening of the aperture and calculates, based on an imaging signal output by the image sensor, a deviation between an optimal exposure amount and a currently set actual exposure amount; and
   an imaging control circuit which performs a second exposure control to control the exposure of the image sensor without changing the opening of the aperture,
   wherein the controller selects either the first exposure control or the second exposure control based on the deviation to control exposure.

2. The photographing apparatus according to claim 1,
   wherein the controller sets a limit exposure control value, the limit exposure control value being used in performing the second exposure control, the limit exposure control value serving as a limit of a first grade of an image to capture, and
   wherein the controller changes to select the first exposure control to control exposure, when the exposure control value reaches the limit exposure control value while the controller is selecting the second exposure control.

3. The photographing apparatus according to claim 2,
   wherein the limit exposure control value is a value depending on a limit of an optimal range of a shutter speed value, an aperture value, or an ISO sensitivity value, the optimal range being an allowable range within which an image quality affected by a flicker, a subject shake amount, or a noise amount falls.

4. The photographing apparatus according to claim 2,
   wherein the controller changes to select the second exposure control to control exposure, when the exposure control value reaches an exposure control value corresponding to an opening limit of the aperture, while the controller is selecting the first exposure control.

5. The photographing apparatus according to claim 2,
   wherein the controller sets a limit of a second grade of a moving image to capture, and sets the limit exposure control value based on the set limit of the second grade of the moving image.

6. The photographing apparatus according to claim 1,
   wherein the second exposure control changes an imaging sensitivity of the image sensor to control exposure.

7. The photographing apparatus according to claim 5,
   wherein the controller can set an exposure mode, and
   wherein the imaging control circuit changes, when a shutter speed priority mode is set as the exposure mode, the imaging sensitivity of the image sensor to control exposure.

8. The photographing apparatus according to claim 1,
   wherein the second exposure control changes an electronic shutter speed of the image sensor to control exposure.

9. The photographing apparatus according to claim 8,
   wherein the controller can set an exposure mode, and
   wherein the imaging control circuit changes, when a program mode is set as the exposure mode, the electronic shutter speed of the image sensor to control exposure.

10. A photographing method of a photographing apparatus including: an imaging optical system; an image sensor which receives a light flux passing through the imaging optical system, captures an image, and outputs an imaging signal; and an aperture which is included in the imaging optical system and which includes an opening to restrict the light flux, the method comprising the steps of:
    calculating a deviation between an optimal exposure amount and a currently set actual exposure amount, based on an imaging signal output by the image sensor;

performing a first exposure control to control the exposure of the image sensor by changing the opening of the aperture;

performing a second exposure control to control the exposure of the image sensor without changing the opening of the aperture; and selecting either the first exposure control or the second exposure control based on the deviation and controlling exposure using the selected exposure control.

11. The photographing method according to claim 10, wherein the step of performing the second exposure includes a step of setting a limit exposure control value serving as a limit of a first grade of an image to capture, and wherein the step of controlling exposure includes a step of changing to select the first exposure control to control exposure, while the second exposure control is selected in selecting the first exposure control and the second exposure control and when the exposure control value reaches the limit exposure control value.

12. The photographing method according to claim 11, wherein the limit exposure control value in controlling the exposure is a value depending on a limit of an optimal range of a shutter speed value, an aperture value, or an ISO sensitivity value, the optimal range being an allowable range within which an image quality affected by a flicker, a subject shake amount, or a noise amount falls.

13. The photographing method according to claim 11, wherein the step of controlling exposure is a step of changing to select the second exposure control to control exposure, while the first exposure control is selected in selecting the first exposure control and the second exposure control and when the exposure control value reaches an exposure control value corresponding to an opening limit of the aperture.

14. The photographing method according to claim 11, further comprising the steps of setting a limit of a second grade of a moving image to capture; and based on the set limit of the second grade, setting the limit exposure control value.

15. The photographing method according to claim 10, wherein the step of performing the second exposure control is a step of changing an imaging sensitivity of the image sensor to control exposure.

16. The photographing method according to claim 15, wherein the step of performing the second exposure control includes a step of setting an exposure mode, and is a step of changing, when a shutter speed priority mode is set as the exposure mode, an imaging sensitivity of the image sensor to control exposure.

17. The photographing method according to claim 10, wherein the step of performing the second exposure control is a step of changing an electronic shutter speed of the image sensor to control exposure.

18. The photographing method according to claim 17, wherein the step of controlling exposure includes a step of setting an exposure mode, and is a step of changing, when a program mode is set as the exposure mode, an electronic shutter speed of the image sensor to control exposure.

* * * * *